Feb. 27, 1945.  F. C. LORNITZO  2,370,553
FABRICATED MULTIPURPOSE PRESSING HEAD
Filed Feb. 23, 1942  2 Sheets-Sheet 1
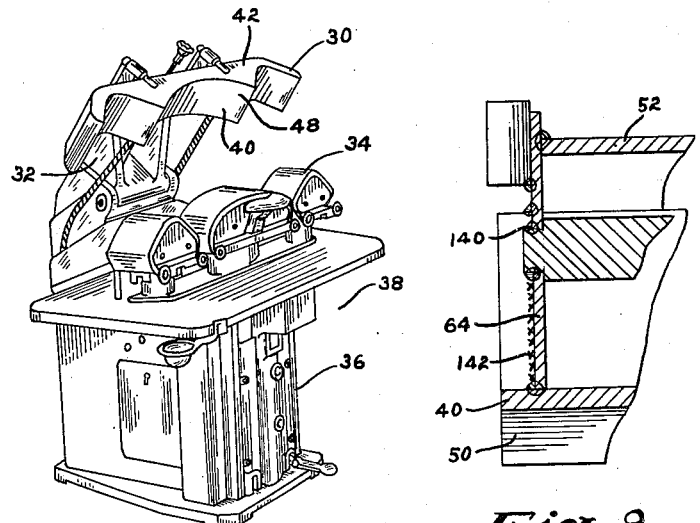
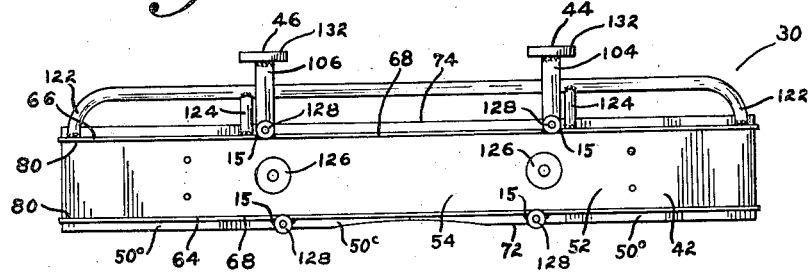
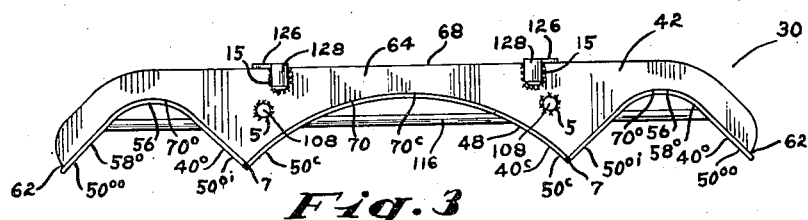
Inventor
Frank C. Lornitzo
By Thomas A. Jenckes
Attorney Feb. 27, 1945. F. C. LORNITZO 2,370,553
FABRICATED MULTIPURPOSE PRESSING HEAD
Filed Feb. 23, 1942 2 Sheets-Sheet 2
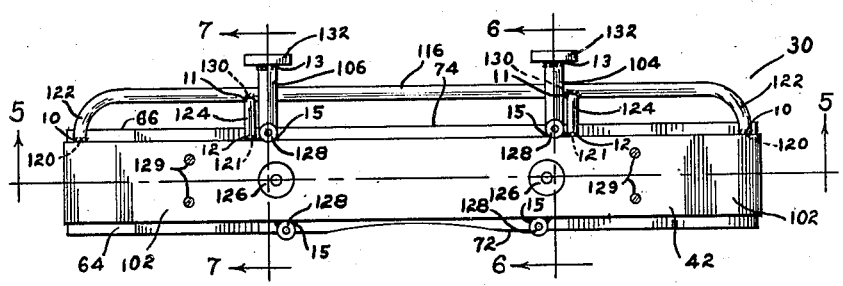
Fig. 4
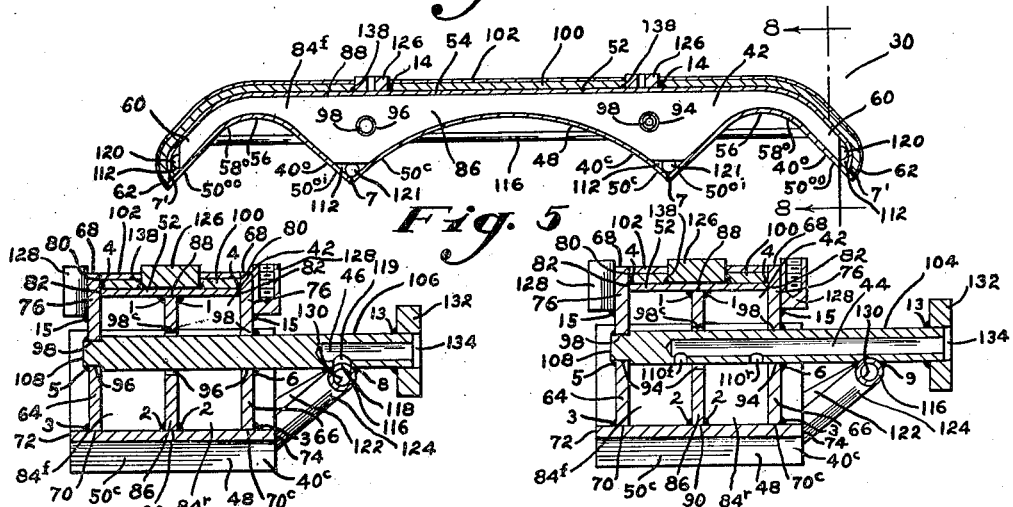
Fig. 5
Fig. 7
Fig. 6
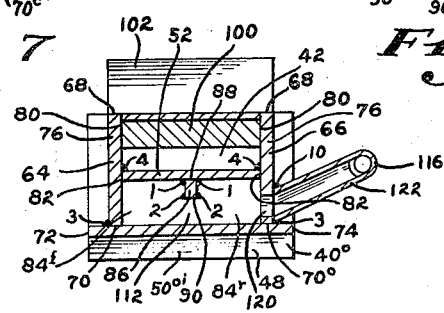
Fig. 8
Inventor
Frank C. Lornitzo
By Thomas A. Jenckes
Attorney Patented Feb. 27, 1945

2,370,553

UNITED STATES PATENT OFFICE 2,370,553

FABRICATED MULTIPURPOSE PRESSING HEAD

Frank C. Lornitzo, Pawtucket, R. I., assignor to Pantex Pressing Machine, Inc., Central Falls, R. I., a corporation of Delaware Application February 23, 1942, Serial No. 432,022

7 Claims. (Cl. 223—57)

My invention relates to improvements in fabricated multi-purpose pressing heads, specifically of a type adapted to press both the cuffs and the collar of a shirt simultaneously.

In certain aspects of my invention, it is a specific application of the broad principles shown and claimed in my co-pending application for Letters Patent for Fabricated pressing head, S. N. 432,021 filed February 23, 1942. As shown in said application, my invention comprises a fabricated pressing head adapted for use in pressing collars and cuffs, made up of a plurality of individually prefabricated parts suitably joined together in accordance with said invention. Due to the fact that with a collar and cuff press, the pressing plate itself is provided with three longitudinally extending arches, a central arch for the collar and end arches for the cuffs, it is impossible to employ a heating fluid receiving chamber of the type shown in said application, and this application, therefore, covers the application of the principles of said application applied to a structure of this description.

The advantages of the present construction as applied to a collar and cuff press are in general similar to those in said application. They include the fact that inasmuch as all the parts are prefabricated they can be made of relatively light material and finished in the desired manner to be smooth and/or non-corrosive. Another advantage is due to the inherent type of fillet welding shown in said application, which not only causes the component parts of my improved pressing head to be fused together but also provides supplemental external elements bolstering all parts of the pressing head against expansion and explosion.

A further object of my invention is to make possible the use of a suitably finished pressing plate.

A further feature of my invention resides in the selection of the component parts thereof to permit of a quick and ready assembly, the parts being preferably successively assembled and successively welded on a foundation member with individual members welded to the foundation member prior to the addition of the other members.

A further object of my invention is to provide a structure in which the successive parts thereof are easily accessible to be readily welded in making up the assembly.

A further feature of my invention relates to the simplicity of structure of the individual parts thereof.

A further feature of my invention resides in the fact that the partition forming member is of such inherently small width that it does not appreciably affect the amount of heat transmitted throughout the area of the pressing plate.

In the prior art, great difficulty has been experienced in suitably draining condensed liquid from the lower ends of the flanks of the respective arches of the pressing head of a collar and cuff press. A further object of my invention is to provide a novel type of drain pipe which will positively drain all condensed liquid from the pressing head on each raising of the head between each pressing operation.

A further object of my invention is to provide a pressing head meeting the requirements of insurance and municipal regulations.

These and such other objects of my invention as may hereinafter appear will be best understood from a description of the accompanying drawings which illustrate an embodiment thereof.

In the drawings,

Fig. 1 is a diagrammatic perspective view of an embodiment of a pressing head suitable for use in a collar and cuff laundry press constructed in accordance with my invention mounted in position on a laundry press.

Fig. 2 is a plan view of my improved pressing head shown in Fig. 1 with the insulating covering and outer shell removed.

Fig. 3 is a side edge elevation illustrating the parts of the pressing head shown in Fig. 2.

Fig. 4 is a plan view of the pressing head shown in Figs. 1–3 with the insulating covering and outer shell attached.

Fig. 5 is a longitudinal sectional view taken along the line 5—5 of Fig. 4.

Fig. 6 is a transverse sectional view taken along the line 6—6 of Fig. 4.

Fig. 7 is a transverse sectional view taken along the line 7—7 of Fig. 4.

Fig. 8 is a transverse sectional view taken along the line 8—8 of Fig. 5.

Fig. 9 is an enlarged diagrammatic transverse sectional view taken through a portion only of the pressing head to additionally illustrate the external fillet welds.

In the drawings, wherein like characters of reference generally indicate like parts throughout, 30 generally indicates a pressing head constructed in accordance with my invention. As shown in Fig. 1, the pressing head 30 is suitably mounted on the end of the pressing lever 32 to pivot downwardly into pressing position over the pressing buck 34, the pressing head 30 being suitably moved to a pressing position pressing the garments against the buck 34 by any suitable means manually or power actuated (not shown). As stated hitherto, I have shown my invention applied to a collar and cuff press, and for this purpose both the pressing head 30 and buck 34 are constructed of shapes to permit the simultaneous pressing of the collar and the two cuffs of a shirt between the head 30 and buck 34. I have shown in Fig. 1, the aforementioned parts mounted on the usual frame 36 of a standard type of a collar and cuff laundry press 38.

As stated hitherto, my invention comprises a pressing head constructed in accordance with the broad principles shown in my co-pending application for Letters Patent aforesaid and includes a pressing plate 40 and a steam or other heating fluid chamber 42 comprising a plurality of longitudinally extending members of substantially the length of said pressing plate, certain of said members having lower edges abutting and externally welded to said pressing plate by externally welded fillets, said members having other edges abutting and externally welded to each other by externally welded fillets to provide longitudinally extending fluid receiving chamber means, preferably a plurality of separate longitudinally extending chamber compartments with said respective externally welded fillets substantially fusing the abutting surfaces together and providing supplemental external reinforcing fillets for said chamber. Said pressing head may be provided with an inlet passage 44 and an outlet or drain passage 46, each connected to each individual chamber when separate chambers are employed, and also preferably with an insulating inner covering 100 and an integral outer shell 102 for said chamber 42 secured to said pressing plate 40. As stated hitherto, a pressing head 30 constructed in accordance with my invention is constructed of a plurality of separate members, including the pressing plate 40 and other members to be described, each of said members being so constructed that the device may be readily assembled by external fillet welding, which for the reasons given hitherto, namely that it fuses the abutting surfaces together and provides external reinforcing fillets, permits the use of separate members of relatively light weight to make up the pressing head assembly. The members making up the pressing head are also so selected and constructed that they may be successively assembled on a foundation member. In the embodiment of my invention shown herein, the foundation member may comprise a central strut plate 86 where separate compartments are employed, but if separate compartments be not employed, said foundation member comprises the pressing plate 40. The pressing plate 40 is constructed of thinner material than hitherto possible in cast pressing heads and may have its pressing surface 48 suitably finished by electroplating or otherwise to provide a smooth uniform, preferably non-corrosive pressing surface.

As shown in the drawings, my invention comprises a hollow heating fluid receiving pressing head 30 for collars and cuffs, comprising pressing plate means 40 consisting of a central bottom pressing plate 40$^c$ of a suitable arch shape to press a collar and a pair of outer bottom plates 40$^o$ of lesser span of a suitable arch shape to press a cuff arranged on each side of said central plate 40$^c$, with the lower ends of the inner flanks 50$^{oi}$ of the outer plates 40$^o$ abutting the flanks 50$^c$ of the central plate 40$^c$ and being secured thereto in any suitable manner, in the embodiment shown by the externally welded fillets 7. If desired, however, the pressing plate means 40 may be constructed of an integral piece of metal with a central pressing portion 40$^c$ of a suitable arch shape to press a collar and outer portions 40$^o$ of lesser span of suitable arch shape to press a cuff arranged on each side of said central portion, with the lower ends of the inner flanks 50$^{oi}$ of the outer portions 40$^o$ thereof adjacent to the lower ends of the flanks 50$^c$ of said central portion 40$^c$. As stated, if multi-compartment heating fluid receiving chamber 42 be not desired, the pressing plate means 40$^c$ and 40$^o$ may comprise the foundation member and the other members to be described may be successively superimposed thereon and welded to each other as they are assembled. To construct said heating fluid receiving chamber 42, in the embodiment shown, I also employ a top plate 52 preferably of lesser width than said bottom pressing plate means 40, having a flat central portion 54 extending beyond the crowns 56 of the arches 58$^o$ of the cuff plates 40$^o$ and portions 60 projecting downwardly towards the lower ends of the outer flanks 50$^{oo}$ of each cuff plate 40$^o$ and then inwardly abutting the lower tips 62 of each outer arch flank 50$^{oo}$ and being secured thereto in any suitable manner, preferably by the externally welded fillets 7'.

To make up the front and rear walls of said heating fluid receiving chamber 42 I employ the vertical front and back plates 64 and 66 respectively, each in the embodiment shown having an upper edge 68 preferably of similar shape to that of said top plate and a lower edge 70 of said arch formation with the respective arch portions 70$^o$ and 70$^c$ to closely abut the upper surface of the pressing plates 40$^o$ and 40$^c$. Said lower edges 70 are suitably secured to the top surface of said bottom plate means 40 at a slightly inset distance from the front and rear edges 72 and 74 thereof, in the embodiment shown by the externally welded fillets 3, said lower edges 70 abutting the top surface of said pressing plate so as to provide an unimpeded lower pressing surface 48 on said pressing plate means 40. The upper portions 76 of said front and rear plates 64 and 66 abut and are externally welded to the top plate 52. In the embodiment shown, the inner surfaces 80 of the upper portions of said front and rear plates abut the edges 82 of the top plate 52 at a slightly downset distance from the upper edges 68 thereof and are suitably secured thereto by the externally welded fillets 4. All the respective externally welded fillets hitherto described, as shown in Fig. 9 and to be described in detail later, substantially fuse the abutting surfaces together and provide supplemental external reinforcing fillets for said heating fluid receiving pressing head.

I prefer to employ a pressing head 30 having a heating fluid receiving chamber 42 having a front compartment 84$^f$ and a rear compartment 84$^r$ separated from each other by a suitable partition 86. For this purpose, in the embodiment shown I provide as said partition a central strut plate 86 of similar shape to said front and back plates but of less relative size, having the upper edge 88 and the lower edge 90 abutting respectively the central longitudinal lines of said top plate 52 and said bottom plate means 40 and suitably secured thereto, in the embodiment shown being externally welded to the top plate by the fillets 1 at each side thereof and to the bottom plate by the fillets 2 on each side thereof, forming the front chamber compartment 84f and the rear chamber compartment 84r. Where this central strut member 86 is employed, it may be employed as the foundation member on which the various parts are successively assembled, the top plate being initially assembled on the upper edge 88 thereof along the central line thereof and suitably secured thereto by the welded fillets 1 on each side thereof. The pressing plate means 40 may then be assembled underneath the central strut member 86 to abut the lower edge 90 thereof along the central line thereof and suitably secured thereto by the welded fillets 2. The front and back plates are then assembled so that the lower edges 70 abut the pressing plate means 40 and are suitably secured thereto by the fillets 3 and the upper portions thereof abut the front and rear edges 82 of the top plate 52 and are suitably secured thereto by the external fillets 4.

I also provide an inlet passage 44 for said heating chamber and an outlet passage 46 for said heating chamber, in the preferred embodiment being preferably constructed as follows: The front plate 64, back plate 66 and central strut plate 86, where employed, are provided with the sets 94 and 96 of aligned horizontal holes 98, substantially above the abutting cuff and collar plate arch flank lower ends. Inlet and outlet pipes 104 and 106 having closed front ends 108 project through said sets 94 and 96 of holes 98 and are externally welded to the edges of said aligned holes in the front and back members 64 and 66 by the respective fillets 5 and 6, the holes 98c in the strut member 86 being larger than the outer peripheries of the inlet and outlet pipes. It is thus apparent that with this construction the pipes 104 and 106 also function as transverse tie rods or stays to supplementally hold the front and rear plates together, providing supplemental reinforcements against expansion in the chamber. The inlet pipe 104 is hollow and is provided with the vent means 110f and 110r discharging within each respective chamber compartment 84f and 84r. Said central plate 86 also has open portions 112 preferably at the lower ends of each respective flank, providing interconnecting outlet passages for said front chamber.

As stated hitherto, my invention also includes a novel type of drain pipe which will positively drain all condensed liquid from the collar and cuff pressing head 30 on each raising of the pressing head between each pressing operation. For this purpose, in the embodiment shown, the rear plate 66 is provided with drain pipe holes at the lower ends of the abutting arch flanks 50c and 50oi and the lower ends of said outer arch flanks 50oo. I also provide a drain pipe 116 preferably connected to said outlet pipe 106 by the respective aligned holes 118 and 119 formed in the abutting pipes or in any other suitable manner, with said pipes being secured together in abutting relationship exterior of said aligned holes in any suitable manner, as by the welded fillet 8 shown. The drain pipe 116 also underlies the inlet pipe 104 and may also be secured thereto to support it in any suitable manner, in the embodiment shown by the welded fillet 9. The drain pipe 116 has downwardly projecting ends 122 connected to suitable draining holes 120 at the lower ends of said outer arch flanks 50oo in any suitable manner, in the embodiment shown by the welded fillets 10, and downwardly projecting branch drain pipes 124 projecting from said drain pipe 116 connected to suitable holes 121 at the lower ends of said abutting arch flanks 50oi and 50c in any suitable manner, in the embodiment shown by the welded fillets 12. The branch drain pipes 124 may be connected to suitable holes 130 in said drain pipe 116 in any suitable manner, such as by the welded fillets 11 shown. The ends of each respective inlet and outlet pipe 104 and 106 may be provided with the flange plates 132 having the holes 134 each suitably secured thereto respectively in any suitable manner, in the embodiment shown by the welded fillets 13. With this construction it is thus obvious that each time the pressing head is raised, all condensed liquid will flow from the pressing head 40 in its lifted position and drain outwards through the holes 120 and 121 in the said front plate 66, through said drain pipe ends 122 and branch drain pipes 124 to said drain pipe 116 to be discharged thereby out through said outlet pipe 106. It is obvious, however, that if desired the drain pipe may discharge in any suitable manner other than through the outlet pipe shown. Insofar as this feature of my invention is concerned, it is apparent that it is immaterial how the heating fluid receiving chamber 42 be constructed, whether it be constructed in the specific manner with the specific number of pieces hitherto described or in any other suitable manner, and it is immaterial whether or not any partition means 86 forming a plurality of compartments 84 in said chamber 42 be employed.

I also may employ suitable means to attach the pressing lever 32 to said pressing head 30. In my preferred embodiment said means comprises the pressing lever attaching bosses 126 externally secured to the upper surface of said top plate 52 by welding or in any other suitable manner, in the embodiment shown by the welded fillets 14, and the pressing lever attaching bosses 128 suitably externally secured to the upper portion of each front and rear plate 64 and 66 substantially above said abutting flanks 50oi and 50c by welding or in any other suitable manner, in the embodiment shown by the welded fillets 15.

I also, as stated, may employ an insulating inner covering 100 constructed of asbestos or any other suitable insulating material for said heating fluid receiving chamber 42 and an integral outer shell 102 preferably constructed of metal for said chamber 42 secured to said pressing plate 40 in any suitable manner, in the embodiment shown by screws 129, and in the embodiment shown where the pressing lever attaching bosses 126 are employed, with suitable holes 138 therein for said attaching bosses.

The various component parts of my invention hitherto described are preferably constructed of metal.

While any suitable type of fillet welding may be employed with sufficient heat to cause the abutting surfaces to at least partially fuse together and to provide the external reinforcing fillets 1—15 hitherto described, I preferably employ arc welding for this purpose. I have shown in Fig. 9 an enlarged view illustrating in detail how this fillet welding functions to partially melt portions of the abutting metal surfaces to cause them to fuse together, as at 140, and also provides the external reinforcing fillet lines 142 to function as supplemental bolstering elements to prevent expansion and explosion of the steam or other heating fluid receiving chamber.

It is apparent that I have provided a novel type of collar and cuff pressing head with the advantages explained above.

It is understood that my invention is not limited to the specific embodiment shown and that various deviations may be made therefrom without departing from the spirit and scope of the appended claims.

What I claim is:

1. A hollow heating fluid receiving pressing head for collars and cuffs comprising bottom pressing plate means having a central pressing portion of a suitable arch shape to press a collar and outer portions of lesser span of suitable arch shape to press a cuff arranged on each side of said central portion with the lower ends of the inner flanks thereof adjacent to the lower ends of the flanks of said central portion, a top plate of lesser width than said bottom pressing plate means having a central portion extending beyond the crowns of the arches of the cuff portions and end portions each projecting downwardly towards the lower end of the outer flank of each cuff portion and then inwardly abutting and externally welded to the lower tip of each outer arch flank and vertical front and back plates each having an upper edge of similar shape to that of said top plate and a lower edge of said arched formation having the lower edges thereof abutting and externally welded to the top surface of said bottom plate means at a slightly inset distance from the front and rear edges thereof and the inner surfaces thereof abutting and externally welded to the top plate at a slightly downset distance from the upper edges thereof, all said respective externally welded fillets substantially fusing the abutting surfaces together and providing supplemental external reinforcing fillets for said heating fluid receiving pressing head.

2. A hollow heating fluid receiving pressing head for collars and cuffs comprising bottom pressing plate means having a central pressing portion of a suitable arch shape to press a collar and outer portions of lesser span of suitable arch shape to press a cuff arranged on each side of said central portion with the lower ends of the inner flanks thereof adjacent to the lower ends of the flanks of said central portion, a top plate having a central portion extending beyond the crowns of the arches of the cuff portions and end portions each projecting downwardly towards the lower end of the outer flank of each cuff portion and then inwardly abutting and externally welded to the lower tip of each outer arch flank and vertical front and back plates each having a lower edge of said arched formation having the lower edges thereof abutting and externally welded to the top surface of said bottom plate means at a slightly inset distance from the front and rear edges thereof and upper portions abutting and externally welded to the top plate, all said respective externally welded fillets substantially fusing the abutting surfaces together and providing supplemental external reinforcing fillets for said heating fluid receiving pressing head.

3. A hollow heating fluid receiving pressing head for collars and cuffs comprising bottom pressing plate means having a central pressing portion of a suitable arch shape to press a collar and outer portions of lesser span of suitable arch shape to press a cuff arranged on each side of said central portion with the lower ends of the inner flanks thereof adjacent to the lower ends of the flanks of said central portion, a top plate having a central portion extending beyond the crowns of the arches of the cuff portions and end portions each projecting downwardly towards the lower end of the outer flank of each cuff portion and then inwardly abutting and externally welded to the lower tip of each outer arch flank, vertical front and back plates each having a lower edge of said arched formation having the lower edges thereof abutting and externally welded to the top surface of said bottom plate means at a slightly inset distance from the front and rear edges thereof and the upper portions abutting and externally welded to the top plate, all said respective externally welded fillets substantially fusing the abutting surfaces together and providing supplemental external reinforcing fillets for said heating fluid receiving pressing head, a central strut plate of similar shape to said front and back plates but of less relative size having the respective upper and lower edges thereof abutting the central lines of said top plate and bottom plate means and externally welded thereto by fillets on each side thereof forming a front and a rear chamber compartment.

4. A hollow heating fluid receiving pressing head for collars and cuffs comprising bottom pressing plate means having a central pressing portion of a suitable arch shape to press a collar and outer portions of lesser span of suitable arch shape to press a cuff arranged on each side of said central portion with the lower ends of the inner flanks thereof adjacent to the lower ends of the flanks of said central portion, a top plate having a central portion extending beyond the crowns of the arches of the cuff portions and end portions each projecting downwardly towards the lower end of the outer flank of each cuff portion and then inwardly abutting and externally welded to the lower tip of each outer arch flank, vertical front and back plates each having a lower edge of said arched formation having the lower edges thereof abutting and externally welded to the top surface of said bottom plate means at a slightly inset distance from the front and rear edges thereof and the upper portions abutting and externally welded to the top plate, and having aligned horizontal holes therein substantially above said abutting cuff and collar plate arch flank lower ends, inlet and outlet pipes having closed front ends projecting through and externally welded to the edges of said aligned holes, all said respective externally welded fillets substantially fusing the abutting surfaces together and providing supplemental external reinforcing fillets for said heating fluid receiving pressing head, said inlet pipe having vent means discharging within said chamber, said rear plate having drain pipe holes at the lower ends of the abutting flanks of said arches and lower ends of said outer arch flanks, a drain pipe connected to said outlet pipe having downwardly projecting ends connected to said holes at the lower ends of said outer arch flanks and downwardly projecting branch drain pipes connected to said holes at the lower ends of said abutting arch flanks and means to tiltably mount said pressing head over a pressing buck of cooperating shape to tiltably oscillate said pressing head to and from a pressing position in contact with said buck and to a raised tilted position permitting intermittent discharges of condensate through said drain pipe in the intervals between said pressing contacts.

5. A hollow heating fluid receiving pressing head for collars and cuffs comprising bottom pressing plate means having a central pressing portion of a suitable arch shape to press a collar and outer portions of lesser span of suitable arch shape to press a cuff arranged on each side of said central portion with the lower ends of the inner flanks thereof adjacent to the lower ends of the flanks of said central portion, a top plate having a central portion extending beyond the crowns of the arches of the cuff portions and end portions each projecting downwardly towards the lower end of the outer flank of each cuff portion and then inwardly abutting and externally welded to the lower tip of each outer arch flank, vertical front and back plates each having a lower edge of said arched formation having the lower edges thereof abutting and externally welded to the top surface of said bottom plate means at a slightly inset distance from the front and rear edges thereof and the upper portions abutting and externally welded to the top plate, and having aligned horizontal holes therein substantially above said abutting cuff and collar plate arch flank lower ends, inlet and outlet pipes having closed front ends projecting through and externally welded to the edges of said aligned holes, all said respective externally welded fillets substantially fusing the abutting surfaces together and providing supplemental external reinforcing fillets for said heating fluid receiving pressing head, a central strut plate of similar shape to said front and back plates but of less relative size having the respective upper and lower edges thereof abutting the central lines of said top plate and bottom plate means and externally welded thereto by fillets on each side thereof forming a front and a rear chamber compartment, said inlet pipe having vent means discharging within each chamber compartment, and said central plate having open portions providing interconnecting outlet passages for said front chamber and said rear plate having drain pipe holes at the lower ends of the abutting flanks of said arches and lower ends of said outer arch flanks, a drain pipe connected to said outlet pipe having downwardly projecting ends connected to said holes at the lower ends of said outer arch flanks and downwardly projecting branch drain pipes connected to said holes at the lower ends of said abutting arch flanks.

6. A hollow heating fluid receiving pressing head for collars and cuffs comprising bottom pressing plate means having a central pressing portion of a suitable arch shape to press a collar and outer portions of lesser span of suitable arch shape to press a cuff arranged on each side of said central portion with the lower ends of the inner flanks thereof adjacent to the lower ends of the flanks of said central portion, a heating fluid receiving chamber having longitudinally extending partition means having outlet passage means at the lower ends of the abutting flanks of the arches and the lower ends of said outer arch flanks and forming compartments arranged transversely thereof superimposed upon said pressing plate means, drain pipe holes in the rear surface of said heating fluid receiving chamber at the lower ends of the abutting flanks of said arches and the lower ends of said outer arch flanks, and a drain pipe having downwardly projecting ends connected to said holes at the lower ends of said outer arch flanks and downwardly projecting branch drain pipes connected to said abutting arch flanks and means to tiltably mount said pressing head over a pressing buck of cooperating shape to tiltably oscillate said pressing head to and from a pressing position in contact with said buck and to a raised tilted position permitting intermittent discharges of condensate through said drain pipe in the intervals between said pressing contacts.

7. A hollow heating fluid receiving pressing head for collars and cuffs comprising bottom pressing plate means having a central pressing portion of a suitable arch shape to press a collar and outer portions of lesser span of suitable arch shape to press a cuff arranged on each side of said central portion with the lower ends of the inner flanks thereof adjacent to the lower ends of the flanks of said central portion, a heating fluid receiving chamber superimposed upon said pressing plate means, an inlet line projecting through the rear surface of said heating fluid receiving chamber, drain pipe holes in the rear surface of said heating fluid receiving chamber at the lower ends of the abutting flanks of said arches and the lower ends of said outer arch flanks and a drain pipe having downwardly projecting ends connected to said holes at the lower ends of said outer arch flanks and downwardly projecting branch drain pipes connected to said holes at the lower ends of said abutting arch flanks and means to tiltably mount said pressing head over a pressing buck of cooperating shape to tiltably oscillate said pressing head to and and from a pressing position in contact with said buck and to a raised tilted position permitting intermittent discharges of condensate through said drain pipe in the intervals between said pressing contacts.

FRANK C. LORNITZO.